(12) United States Patent
Derry et al.

(10) Patent No.: US 11,965,802 B2
(45) Date of Patent: Apr. 23, 2024

(54) HEALTH MONITORING OF MULTI-SLICE HINGE LINE ACTUATORS

(71) Applicant: Goodrich Actuation Systems Limited, Solihull (GB)

(72) Inventors: John Derry, Burton on Trent (GB); Colin R. Harrison, Wolverhampton (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 30 days.

(21) Appl. No.: 17/829,858

(22) Filed: Jun. 1, 2022

(65) Prior Publication Data

US 2023/0066002 A1    Mar. 2, 2023

(30) Foreign Application Priority Data

Jun. 18, 2021 (EP) .................................... 21275087

(51) Int. Cl.
*G01M 13/00* (2019.01)
*B64C 13/28* (2006.01)
(Continued)

(52) U.S. Cl.
CPC ............. *G01M 13/00* (2013.01); *B64C 13/28* (2013.01); *F16H 21/40* (2013.01); *G01L 1/205* (2013.01); *G01L 1/246* (2013.01)

(58) Field of Classification Search
CPC ........ G01M 13/00; B64C 13/28; B64C 13/50; F16H 21/40; G01L 1/205; G01L 1/246; B64F 5/60; H02K 11/20; H02K 11/24; H02K 16/00; H02K 41/02; H02K 2213/06; H02K 2213/12; B64D 2045/0085
See application file for complete search history.

(56) References Cited

U.S. PATENT DOCUMENTS 8,726,652 B1    5/2014  Gunter
9,016,991 B2    4/2015  Twerdochlib et al.
(Continued)

FOREIGN PATENT DOCUMENTS

EP    3312475 A2    4/2018
EP    3312475 A3    9/2018
(Continued)

OTHER PUBLICATIONS

European Search Report for Application No. 21275087.1, dated Dec. 14, 2021, 10 pages.

*Primary Examiner* — Freddie Kirkland, III
(74) *Attorney, Agent, or Firm* — CANTOR COLBURN LLP

(57) ABSTRACT

A multi-slice hinge-line actuator includes a plurality of actuator slices mounted around a common axis of rotation and arranged to be rotated around the axis of rotation by a drive means in response to a control signal, the slices spaced axially along the axis of rotation. Each actuator slice has a first attachment means for attachment to a relatively fixed structure and a second attachment means for attachment to a moveable structure to be moved by the actuator in response to the control signal. The actuator also includes means for monitoring a strain pattern in the actuator at a plurality of locations along the axial direction of the actuator.

8 Claims, 3 Drawing Sheets

(51) Int. Cl.
*F16H 21/40* (2006.01)
*G01L 1/20* (2006.01)
*G01L 1/24* (2006.01)

(56) References Cited

U.S. PATENT DOCUMENTS

| | | | |
|---|---|---|---|
| 9,483,057 B2 | 11/2016 | Dorr et al. | |
| 9,751,617 B2 * | 9/2017 | Balsiger | B64C 13/28 |
| 10,220,937 B2 * | 3/2019 | Balsiger | B64C 13/28 |
| 10,266,251 B2 * | 4/2019 | Balsiger | G01D 5/147 |
| 10,421,532 B2 | 9/2019 | Schwartz | |
| 10,700,573 B2 | 6/2020 | Fukushima | |
| 10,759,515 B2 | 9/2020 | Van De Veire et al. | |
| 11,479,371 B1 * | 10/2022 | Perry | B64C 9/00 |
| 2016/0152322 A1 | 6/2016 | Balsiger et al. | |
| 2017/0021914 A1 | 1/2017 | Small et al. | |

FOREIGN PATENT DOCUMENTS

| | | |
|---|---|---|
| WO | 2016020915 A1 | 2/2016 |
| WO | 2017063823 A1 | 4/2017 |

\* cited by examiner

HEALTH MONITORING OF MULTI-SLICE HINGE LINE ACTUATORS

CROSS REFERENCE TO RELATED APPLICATIONS

This application claims priority to European Patent Application No. 21275087.1 filed Jun. 18, 2021, the entire contents of which is incorporated herein by reference.

TECHNICAL FIELD

The present disclosure relates to multi-slice hinge line actuators such as for aircraft wings, and for arrangements for monitoring the health of such actuators.

BACKGROUND

Actuators are used in many areas where components or surfaces are to be moved. Actuators may be mechanical, hydraulic, electric, electromechanical, electrohydraulic etc. Actuators of various types are used to move aircraft surfaces such as doors, flaps, slats, panels, etc., whether these are flight control surfaces or other panels.

In some fields, special consideration needs to be given to the location of the actuator and its size and or weight. This is the case, for example, where actuators are used in aircraft where it is important to minimise the size and weight of parts whilst maintaining reliability. Actuator designs have been developed to provide effective movement of flight control surfaces along the length of an aircraft wing. Hinge-line actuators have been developed to enable the movement of flight control surfaces. These hinge-line rotary mechanical actuators are in the form of a hinge structure having a rotational axis for the hinge, with this rotational axis aligned with that of the movable flight control surface so that the actuator acts as a hinge that allows angular rotation of the flight control surface. Hinge-line actuators can be designed for other applications, even other than in aircraft, where a surface or part is to be moved by rotation about an axis.

When designing an aircraft flight control system, consideration must be given to the potential failure modes of the actuators used. Internal component failures can cause the actuator to become jammed or disconnected, that is the mechanical load path from the input of the actuator to the output at the surface is lost. Such problems can arise in all other applications where hinge-line actuators are used. Also, where space is limited e.g. in thin-wing aircraft, there is insufficient space in the wing to have a single actuator that can withstand the total loading on the flight control surface it is attached to.

More recently, so-called multi-slice hinge-line actuators have been developed such as described in US 2016/0152322. These actuators comprise a number of layers or slices coupled to a common input shaft motor stator that rotates about a rotational axis. Each slice is configured to rotate about the axis. The slices are attached to the movable surface and act together to cause the surface to rotate. The individual slices share the load substantially equally.

With such multi-slice actuators, if one of the slices is damaged such that that slice is no longer effective in taking or transferring part of the load, the load for that slice will be distributed amongst the other slices. Whilst this ensures that the necessary load continues to be transferred to the movable surface, it does mean that the remaining working slices will be subjected to higher loads than expected which can result in too much stress on those slices and lead to failure of the actuator.

Because the load is distributed between all slices even when one or more slices fails, it is not immediately apparent that a slice has failed because the actuator will continue to move the surface as required. The failure of one or more slices might therefore only become apparent during maintenance checks while the aircraft is on the ground or, more of a problem, if the entire actuator fails because the working slices have been subject to too much stress and also fail. This is, at least, costly and time intensive to repair, but can also be hazardous if failure occurs during flight.

There is, therefore, a need to monitor the health of all slices of a multi-slice hinge-line actuator.

SUMMARY

According to the present disclosure, there is provided multi-slice hinge-line actuator comprising: a plurality of actuator slices mounted around a common axis of rotation and arranged to be rotated around the axis of rotation by a drive means in response to a control signal, the slices spaced axially along the axis of rotation; each actuator slice having a first attachment means for attachment to a relatively fixed structure and a second attachment means for attachment to a moveable structure to be moved by the actuator in response to the control signal; and means for monitoring a strain pattern in the actuator at a plurality of locations along the axial direction of the actuator.

The first attachment means may comprise one or more mounting pins extending axially and connecting the plurality of slices. The means for monitoring the strain pattern may be mounted in or on one or more of the one or more mounting pins.

The means for monitoring the strain pattern may comprise a strain gauge e.g. an electrical strain gauge or an optical strain gauge with multiple Fiber Bragg gratings.

Also provided, is a method of monitoring a multi-slice hinge-line actuator, comprising monitoring a strain pattern at a plurality of locations along the axial direction of the actuator and determining whether one or more slices of the actuator has become defective based on the strain pattern.

BRIEF DESCRIPTION

Embodiments of the disclosure will now be described by way of example only, with reference to the drawings. Although described in the context of a multi-slice hinge-line actuator for use in moving aircraft panels and surfaces e.g. wing panels, it should be understood that the apparatus and method of the disclosure are applicable to multi-slice actuators for other uses.

DETAILED DESCRIPTION

Figure 1:
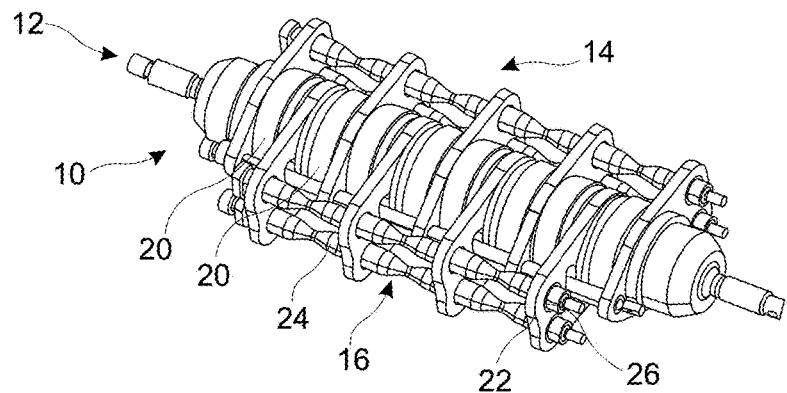
FIG. 1 shows a perspective view of a typical multi-slice hinge-line actuator into which the assembly of the present disclosure can be incorporated.

The multi-slice actuator 10, such as shown in FIG. 1, is designed by be arranged in the line of rotation of the part or surface to be moved like a hinge and is controlled in response to receiving a control signal from a controller (not shown). The actuator defines a rotational axis 12 that is, in use, aligned with the axis of rotation of the movable surface (not shown). One side 14 of the actuator is arranged to be fixed to a fixed structure (e.g., the non-movable part of the aircraft wing). The actuator comprises a number of actuator slices 20 spaced axially along the length of the axis and that rotate about the axis. Each of the multiple slices 20 along the length of the actuator defines a slice arm 22 arranged to be mounted, in use, to the surface or panel to be controlled (not shown). The attachment may be by means of a bolt or pin 24 that passes through eyelets 26 in each of the slice arms 22 and the bolt is fastened to the movable surface. Other means of attaching the slices to the movable surface may also be used. Thus, the actuator can be controlled responsive to a signal from the controller so that the slice arms rotate and control the angle of the movable surface to which they are attached. The structure and general operation of the multi-slice hinge-line actuator is generally known and will not be described further in this disclosure.

As mentioned above, the objective of the present disclosure is to provide an assembly whereby the health of the slices of the actuator can be monitored and an indication can be provided if one or more of the slices ceases to perform properly, thus not taking up its share, or its full share of the load.

According to this disclosure, means are provided to monitor the strain pattern along the length direction of the actuator in the load paths between the fixed structure and the actuator to determine changes in the pattern of the strain distributed between the slices. The pattern will provide an indication of how the load is shared between the slices. A change in the strain distribution is indicative of one or more of the slices taking more or less of the load and can, therefore, be used to determine that one or more of the slices has become damaged or defective.

The strain pattern can be measured or monitored in different ways and the way in which the strain pattern is monitored is not limiting on the disclosure.

Figure 2:
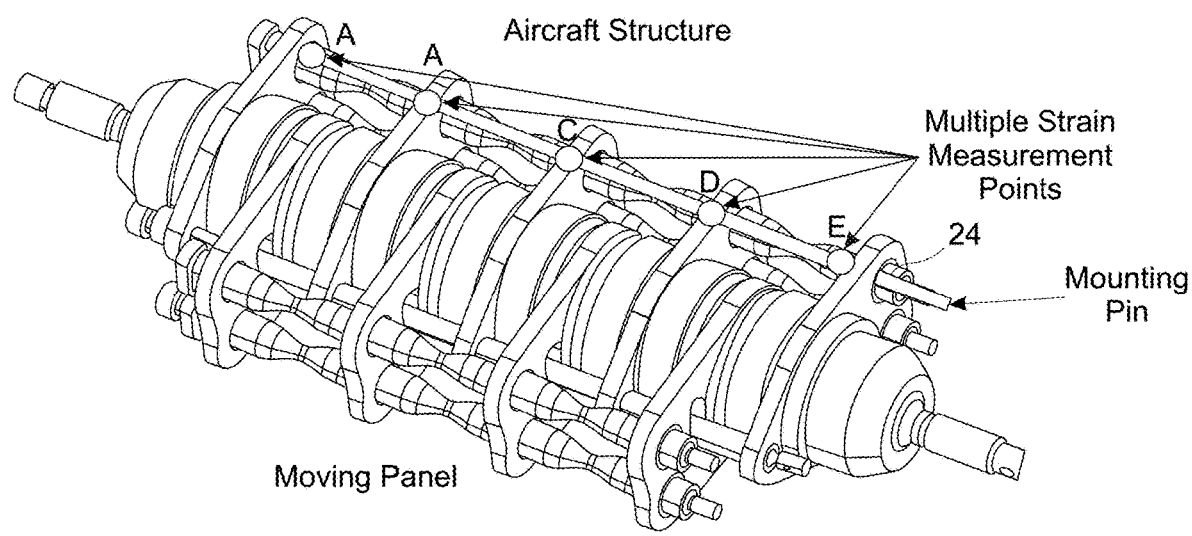
FIG. 2 shows an example of a multi-slice hinge-line actuator modified according to the present disclosure.

In one example, as shown in FIG. 2, the strain can be measured at multiple points, A, B, C, D, E, along the mounting pin or rod 24—i.e. where the actuator is fixed to the aircraft structure or the like. The mounting pin 24 is attached to all of the slices 20 e.g., by passing through an opening in each slice arm as shown in FIG. 2 and so extends along the axial length of the actuator. The mounting pin therefore provides part of the load path between the multiple slices. A means for measuring the strain at multiple points A,B,C,D,E, along the pin is provided (described further below). A change in the strain pattern between the multiple points is indicative of a change in the distribution of load between the slices 20. The change in strain can be determined by monitoring absolute strain levels at the multiple points and comparing them to a predetermined threshold level. The actual strain on the pin along its length may, however, vary due to normal operating conditions such as aircraft flight conditions and so it may be preferable to monitor changes in the strain distribution rather than absolute levels or values.

Figure 3A:
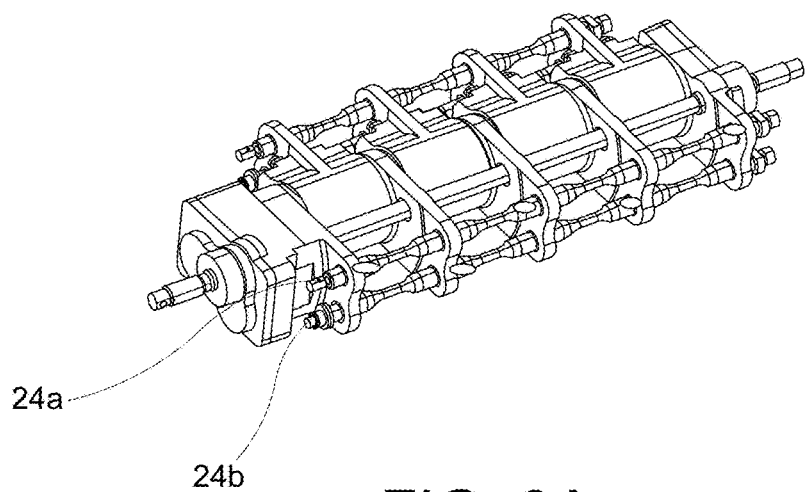
FIGS. 3A and 3B show alternative examples using the principles of the present disclosure.
Figure 3B:
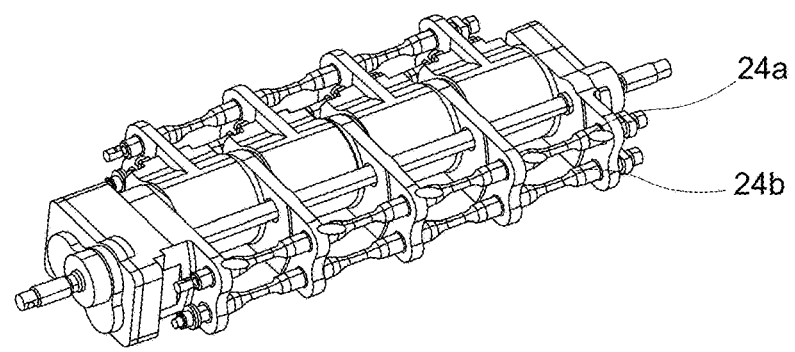

In some actuator assemblies, such as the examples shown in the drawings, two mounting pins—an upper mounting pin 24a and a lower mounting pin 24b may be provided. The strain measurement points may be provided on a single pin as shown in FIG. 3B or, if, for example, there is a space restriction as to the number of strain measurement points that can be located on a single pin (e.g., because of the size of the strain measuring device being used), the measurement points may be shared across both pins. The actual number and location of strain measurement points may vary depending on the application of the actuator and on factors such as the load sharing pattern between slices, the stiffness of the actuator and structure, the loading on the movable part etc.

Although it is efficient to provide the strain measurement points along the already present mounting pin(s) 24, it is conceivable that strain measurement points could be provided on different parts of the actuator along its length or additional components could be added to the actuator on which to mount the strain measuring devices.

The present disclosure is not limited to any particular device or method for measuring strain.

Figure 4:
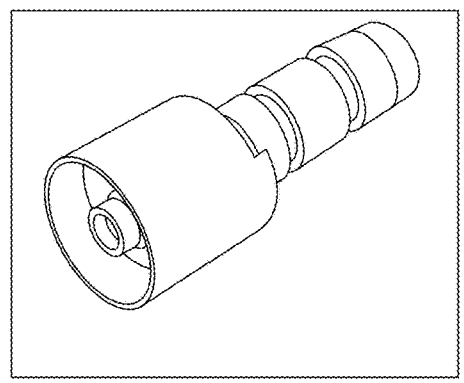
FIG. 4 shows a possible embodiment of a strain gauge for use in the assembly of the disclosure.

One example may be to use an electrical strain gauge such as shown in FIG. 4. Such strain gauges can be mounted into pins or hollow bodies so as to protect the components and wiring. Such strain gauges could, therefore, be provided inside the mounting pin(s) 24 or could be attached to the mounting pin(s) along the axial length at the strain measurement points.

Figure 5:
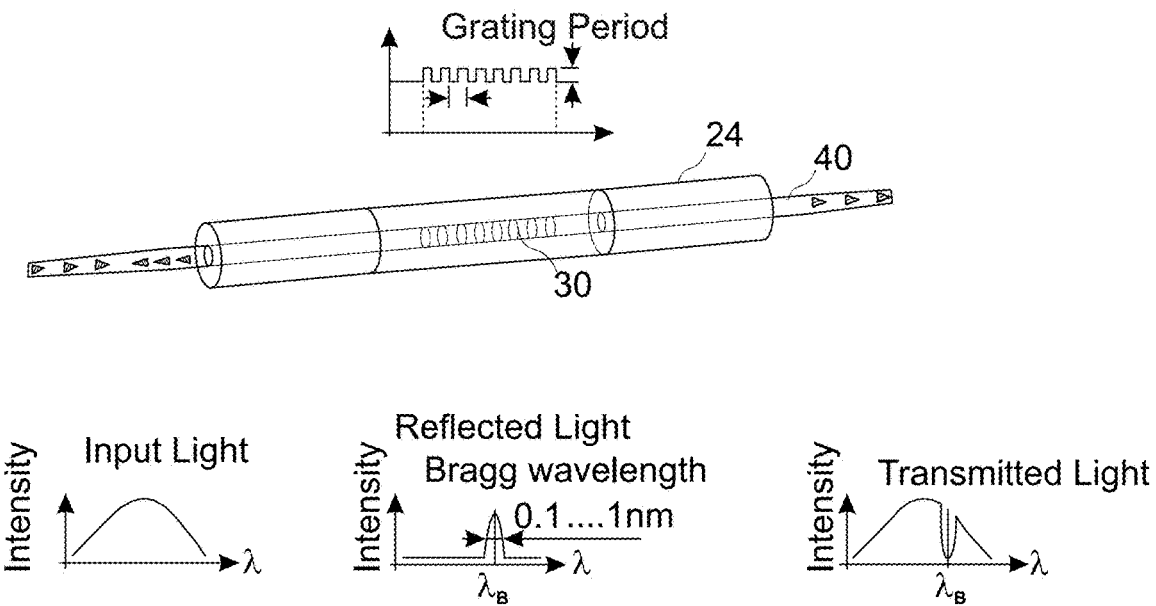
FIG. 5 shows the principle of an alternative strain measuring concept for use in the assembly of the disclosure.
Figure 6:
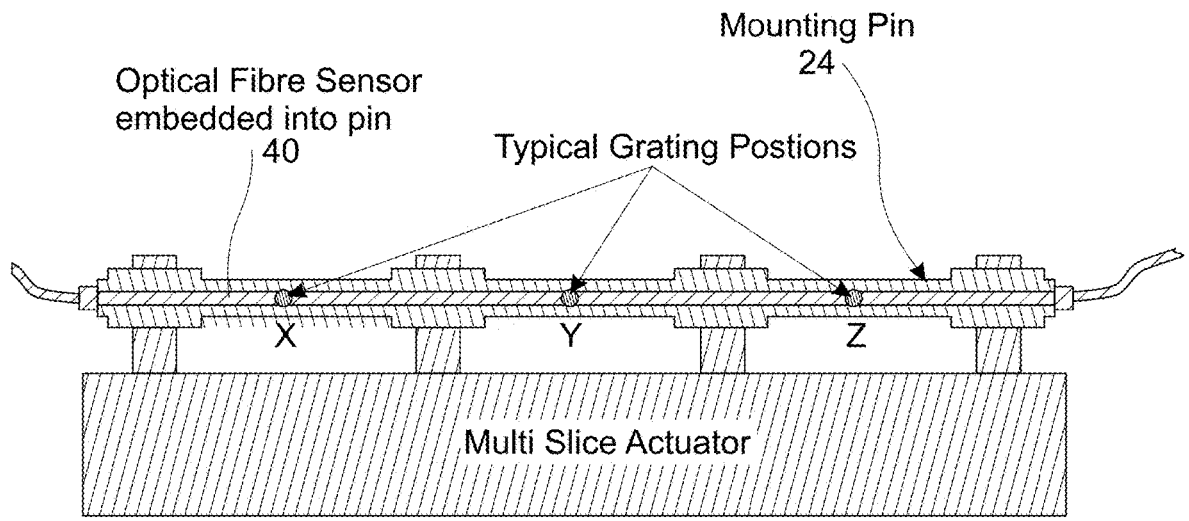
FIG. 6 shows an alternative embodiment using the principles of the present disclosure.

An alternative option, avoiding the need to provide multiple wires inside or along the mounting pin(s), is the use of an optical strain gauge as shown in FIGS. 5 and 6. As an example, multiple Fibre Bragg Gratings 30 could be provided onto a single fibre optic cable 40 which can then be mounted inside or along the load pin(s) or at another location extending along the axial length of the actuator. The refraction pattern can then be observed, based on the Bragg grating pattern, at multiple locations X, Y, Z, to monitor the strain pattern along the length of the actuator. An optical strain gauge may also have the advantage that signals from several actuators can be combined and transmitted along a single cable, to a central controller (not shown).

Measurement of the strain pattern along the actuator length may also be realised in other ways known to the skilled person.

By monitoring the strain pattern, it is possible to detect if one or more of the multiple slices of the actuator has become disconnected from the load path, since the strain pattern will indicate a change in the degree of bending at the measurement points and thus indicate that that the load share between the remaining slices has changed. This allows a problem with a slice to be identified during use rather than only at scheduled maintenance or when a full failure occurs.

The invention claimed is:

1. A multi-slice hinge-line actuator comprising:
    a plurality of actuator slices mounted around a common axis of rotation and arranged to be rotated around the axis of rotation by a drive means in response to a control signal, the slices spaced axially along the axis of rotation;
    each actuator slice having a first attachment means for attachment to a relatively fixed structure and a second attachment means for attachment to a moveable structure to be moved by the actuator in response to the control signal; and
    means for monitoring a strain pattern in the actuator at a plurality of locations along the axial direction of the actuator.

2. The actuator as claimed in claim 1, wherein the first attachment means comprises one or more mounting pins extending axially and connecting the plurality of slices.

3. The actuator as claimed in claim 2, wherein the means for monitoring the strain pattern is mounted in or on one or more of the one or more mounting pins.

4. The actuator as claimed in claim 1, wherein the means for monitoring the strain pattern comprises a strain gauge.

5. The actuator as claimed in claim 4, wherein the strain gauge is an electrical strain gauge.

6. The actuator as claimed in claim 4, wherein the strain gauge is an optical strain gauge.

7. The actuator as claimed in claim 6, wherein the optical strain gauge comprises a fibre optic cable extending along the axial length of the actuator and having a Fibre Bragg grating located at each of the plurality of locations.

8. The actuator as claimed in claim 1, wherein the actuator is configured for moving a movable surface of an aircraft wing, the first attachment means arranged to be attached to an aircraft structure, the second attachment means arranged to be attached to the movable surface of the aircraft wing.

* * * * *